United States Patent [19]

Andreev et al.

[11] 3,847,113

[45] Nov. 12, 1974

[54] DEVICE FOR RATED PASTING OF INSECT EGGS ON SUBSTRATUM

[76] Inventors: Sergei Vasilievich Andreev, prospekt Stachek, d. 57, kv. 62, Leningrad; Mikhail Grigorievich Leibenzon, Solnechnogorsky GOM, zavod 4, dom 6, kv. 6, Povarovo; Jry Petrovich Trushin, Dmitrovskoe shosse, 43, kv. 212, Moscow; Mikhail Sergeevich Luzgin, prospekt Mechnikova, 3, kv. 27, Leningrad, all of U.S.S.R.

[22] Filed: Jan. 15, 1973

[21] Appl. No.: 323,401

[52] U.S. Cl............ 118/40, 424/366, 119/1, 117/3, 118/310, 118/206, 118/221

[58] Field of Search ......... 118/262, 221, 206, 304, 118/318, 310, 57, 40

[56] References Cited
UNITED STATES PATENTS

| | | | |
|---|---|---|---|
| 1,439,464 | 12/1922 | Bowersock | 118/262 |
| 1,854,071 | 4/1932 | Schacht | 118/226 X |
| 2,108,645 | 2/1938 | Bryant | 118/57 UX |
| 2,223,476 | 12/1940 | Amstuz | 118/308 X |
| 2,245,301 | 6/1941 | Schacht | 118/206 X |
| 2,402,183 | 6/1946 | Rowe et al | 118/308 X |
| 3,371,000 | 2/1968 | Davenport et al | 118/221 X |
| 3,502,052 | 3/1970 | Walsh | 118/57 |

*Primary Examiner*—Ronald Feldbaum
*Attorney, Agent, or Firm*—Holman & Stern

[57] ABSTRACT

A device for rated pasting of insect eggs on a substratum is disclosed, said device comprising a receiving bin for insect eggs with a dosing attachment; a roll of the substratum; an attachment for applying the sticky substance to the substratum including a tank with the sticky substance and a system of rollers owing to which a uniform thin layer of paste is applied to the substratum; and two driving shafts with mutually-parallel axles forming a V-loop from the substratum to paste the insect eggs on it for obtaining only one layer of eggs on the substratum, one of the two driving shafts having a shaking attachment used to cut the substratum with the eggs pasted on it into predetermined stretches.

6 Claims, 2 Drawing Figures

DEVICE FOR RATED PASTING OF INSECT EGGS ON SUBSTRATUM

BACKGROUND OF THE INVENTION

The present invention relates generally to the field of agriculture, and more particularly, it relates to devices for rated pasting of the insect eggs on the substratum. The present invention is applicable to artificial breeding of insects (parasitic insects) which eradicate noxious insects.

For utilizing effectually the biological method for controlling noxious insects, it is necessary to provide an optimal relationship between the population of the noxious insects on a certain area where agricultural crops are cultivated, and the number of the parasitic insects let free.

Thus, it is necessary to have accurate information on the number of the available parasitic insects.

In order to meet the above mentioned conditions, it is necessary to distribute a rated amount of parasitic insects over a certain area of the substratum or in a certain tank.

Heretofore known devices are incapable of producing a rated distribution of insect eggs on the substratum.

In order to breed parasitic insects, it is necessary to have eggs of the owner insect.

The eggs of the owner insect are used to breed and deliver in them the egg-eaters of the noxious insects to the fields. The egg-eaters coming out of the eggs contaminate under field conditions the eggs laid by the noxious insects, thus destructing them at the egg stage.

SUMMARY OF THE INVENTION

The object of the present invention is to provide a device for rated distribution of eggs of the owner insect on the substratum which is intended to be subsequently contaminated by parasitic insects.

Another object of the present invention is to provide conditions for further mechanization of breeding parasitic insects.

For attaining this object, it is necessary to utilize the device for rated pasting of the eggs of owner insect on the substratum which, according to the invention, comprises a bin for eggs with a dosing attachment, a roll of substratum, an attachment for applying the sticky substance to the substratum, two driving shafts having axles which are mutually-parallel and symmetrically-arranged under the bin, and intended to form from the substratum a V-loop, with the insect eggs being supplied to the loop and a limiter of the loop located under the shafts and therebetween, and also a shaking attachment disposed on one of the driving shafts for shaking the extra eggs off the sticky substratum and a cutting attachment used to cut the substratum with the eggs pasted on it into pre-determined stretches.

The device disclosed in the present invention makes it possible to rate the parasitic insects to be introduced into the areas where agricultural crops are cultivated, and thus to fight effectively against noxious insects which destroy agricultural crops. Since it is possible to calculate accurately in advance the required number of parasitic insects taking into account the degree to which the territory under crops is infested with the noxious insects, the biological method of control becomes more effective.

Besides, the present device allows for mechanizing all the subsequent labor-consuming operations involved in the stages of breeding parasitic insects.

The device, according to the present invention, incorporates an attachment for applying sticky substance to the substratum comprising a tank with sticky substance, contacting one another along the generatrix are a driving shaft partially immersed in the tank, an intermediate roller transferring the paste and the paste-applying roller for coating the substratum with the sticky substance.

It is expedient to have the paste-applying roller constructed with equally-spaced circular grooves.

If this condition is observed, the substratum will have sections free of paste, and subsequently free of eggs, these sections being used as lines along which the substratum is cut into definite stretches.

The device disclosed in the present invention comprises a dosing attachment located on the bin for insect eggs incorporating a plate arranged under the slot in the bottom of the bin and an electromagnetic vibrator connected to the bin and the plate.

It is advisable that the length of the slot in the bottom of the bin and the length of the dosimeter plate in the device of the present invention be equal to the width of the utilized substratum.

With this condition being observed, the insect eggs coming out of the bin cover the substratum over its entire width without leaving any space uncovered or falling past the substratum.

The device disclosed in the present invention comprises a shaking attachment representing a ratchet fastened to the axle of one of the driving shafts designed to form a V-loop from the substratum, the notches of the ratchet contacting the pawl rigidly secured to the striking strip.

The application of the attachment provides only one layer of insect eggs spread over the substratum.

BRIEF DESCRIPTION OF THE DRAWINGS

These and others objects and advantages of this invention will be apparent from the following detailed description of the embodiment and the accompanying drawings, wherein.

DETAILED DESCRIPTION OF THE PREFERRED EMBODIMENT

Figure 1:
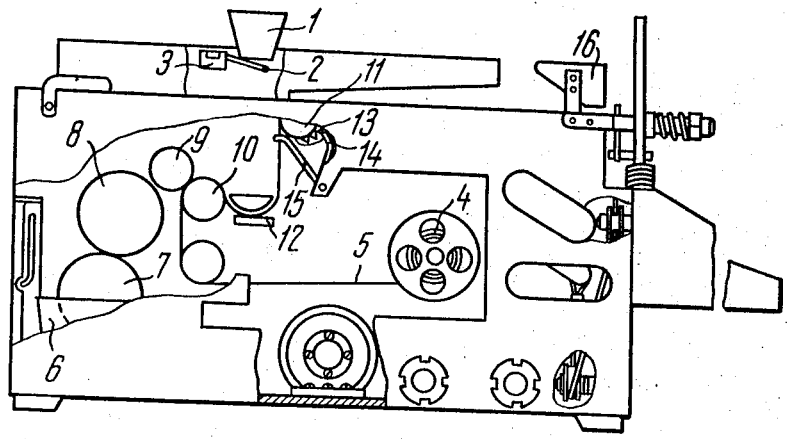
FIG. 1 is a device for rated pasting of insect eggs on the substratum, according to the invention (longitudinal cross-section)
Figure 2:
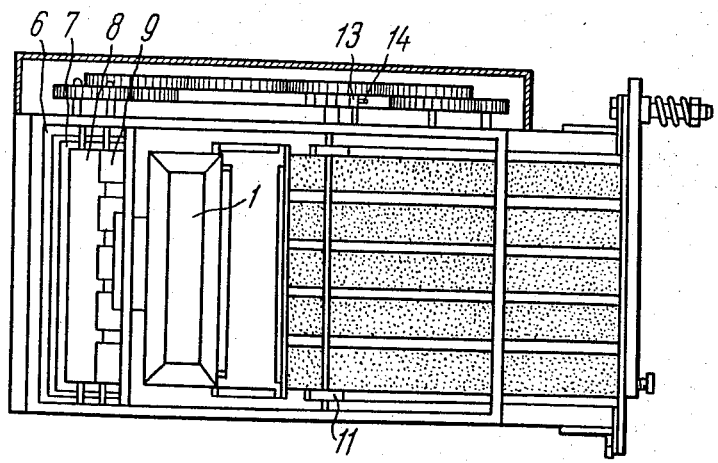
FIG. 2 is a top view of the same device.

The device for rated pasting of insect eggs on the substratum comprises a bin 1 for eggs with a dosing attachment incorporating a plate 2 arranged under the slot in the bottom of the bin 1, and an electromagnetic vibrator 3 connected to the bin 1 and the plate 2, the length of the slot in the bottom of the bin 1 and the length of the dosimeter plate 2 being equal to the width of the utilized substratum.

Furthermore, the device disclosed in the present invention comprises a roll 4 with the substratum 5 for which use should be made of a paper tape with dash-dotted notches (longitudinal and transverse) which will subsequently facilitate the division of the substratum with the eggs pasted on it, into smaller stretches. The device of the present invention incorporates also an attachment for applying a sticky substance, for example, a polymer paste, to the substratum, comprising a tank 6 with the sticky substance, contacting one another along the generatrix are a driving shaft 7 partially immersed in the tank 6, an intermediate roller 8 transferring the paste and a paste-applying roller 9 for coating the substratum 5, i.e., rubber tape, with the sticky substance.

It has been found expedient to construct the paste-applying roller 9 with equally spaced circular grooves. The grooves are so arranged that, while the paste-applying roller 9 contacts with the substratum 5, they coincide with the dash-dotted notches of the substratum 5 which, as has been mentioned above, provides for an easy division of the substratum into smaller stretches without damaging the eggs pasted on it. Moreover, by covering the protruding elements of the paste-applying roller 9 with belts of elastic porous material, a more uniform and smooth adhesive layer is obtained on the substratum.

Furthermore, the device of the present invention comprises two driving shafts 10 and 11 located symmetrically under the bin 1 with their axles being held mutually parallel. The shafts 10 and 11 are designed to form from the substratum 5 a V-loop which is supplied with the insect eggs from the bin 1. The size of the V-loop, i.e., its depth, is determined by the limiter 12 which is disposed under the shafts 10 and 11 and therebetween.

The device of the present invention comprises also a shaking attachment located on one of the driving shafts 11 used for shaking the extra eggs off the sticky substratum 5.

This shaking attachment is a ratchet 13 fastened to the axle of the driving shaft 11, with the notches of the ratchet 13 contacting the pawl 14 rigidly secured to the striking strip 15.

The device of the present invention includes a cutting attachment 16 used to cut the substratum 5 with the insect eggs pasted on it into pre-determined stretches.

The device for rated pasting of the insect eggs on the substratum, according to the present invention, operates in the following manner.

The paper tape 5 with the preliminarily-cut dash-dotted longitudinal and transverse notches is supplied from the roll 4 to the attachment for applying sticky substance, where the driving shaft 7 partially immersed in the tank 6 with polymer paste transfers the paste onto the intermediate roller 8 which, in turn, applies the paste to the paste-applying roller 9 whose surface is covered with equally-spaced circular grooves, with the paste being then transferred onto the paper tape 5, and as this takes place, the circular grooves of the paste-applying roller 9 while contacting the longitudinal dash-dotted notches of the paper tape 5, accurately match them; then the paper tape 5 with a layer of paste in the form of strips on it is delivered to the two driving shafts 10 and 11 whose rotational speed ensures the maintenance of the pre-determined V-form and speed of the paper loop. The insect eggs freed from foreign matter and located in the bin 1 due to the dosing attachment which represents a plate 2 disposed under the slot in the bottom of the bin 1 and connected to the electromagnetic vibrator 3 pour out periodically of the bin 1 and get into the V-loop formed of the paper tape 5 which moves at a constant speed. It should be noted that the slot in the bin 1 corresponds to the width of tape, thus enabling the eggs to be pasted on the entire sticky area of the tape.

The shaking attachment constructed in the form of a ratchet 13 fastened to the axles of one of the driving shafts 11 that form the V-loop, with the notches of the said ratchet being in contact with the pawl 14 rigidly secured to the striking strip 15, leaves only one layer of eggs pasted on the tape, with all the eggs that got atop the first layer of the sticky sections of the tape disengaging and rolling into the V-loop.

Then the tape with the single layer of insects eggs pasted on it is supplied to the cutting attachment 16 where the tape is cut into equal stretches.

What is claimed is:

1. A device for rated pasting of insect eggs on a substratum comprising: a roll of the substratum; attachment means for coating the substratum with sticky substance; a bin for the insect eggs; two driving shafts having axles which are mutually parallel and symmetrically-arranged under said bin used to form from the substratum a V-loop which is supplied with the insect eggs from said bin; a limiter restricting the size of the V-loop formed from the substratum located under said shafts and therebetween; a dosing attachment located on said bin; shaking attachment means disposed on one of said driving shafts for shaking the extra eggs off the sticky substratum; and cutting attachment means for cutting the substratum with the eggs pasted on it into predetermined stretches.

2. A device as set forth in claim 1, wherein said attachment means for coating the substratum with sticky substance comprises: a tank with sticky substance; a driving shaft partially immersed into said tank with the sticky substance, an intermediate roller transferring a paste, and a paste-applying roller for coating the substratum delivered from the roll with the sticky substance, all these elements contacting one another along the generatrix.

3. A device as set forth in claim 2, wherein said paste-applying roller is constructed with equally-spaced circular grooves.

4. A device as set forth in claim 1, wherein said dosing attachment located on said bin comprises: a plate disposed under the slot in the bottom of said bin and an electromagnetic vibrator connected to said bin and said plate.

5. A device as set forth in claim 4, wherein the length of the slot in the bottom of said bin and the length of said dosimeter plate are equal to the width of the utilized substratum.

6. A device as set forth in claim 1, wherein said shaking attachment means comprises a ratchet fastened to the axle of one of said driving shafts used to form from the substratum a V-loop; a pawl contacting said ratchet; and a striking strip rigidly secured to said pawl.

* * * * *